United States Patent [19]

King

[11] 4,206,031
[45] Jun. 3, 1980

[54] FOAM GENERATING METHOD AND APPARATUS

[76] Inventor: Arthur S. King, 8021 Cherokee La., Leawood, Kans. 66206

[21] Appl. No.: 942,050

[22] Filed: Sep. 13, 1978

Related U.S. Application Data

[63] Continuation-in-part of Ser. No. 807,051, Jun. 16, 1977, Pat. No. 4,120,765.

[51] Int. Cl.$^2$ .............................................. C02C 5/12
[52] U.S. Cl. .................................. 204/272; 204/149; 204/275; 210/44
[58] Field of Search .............. 204/149, 152, 151, 272, 204/275; 210/44

[56] References Cited

U.S. PATENT DOCUMENTS

| | | | |
|---|---|---|---|
| 2,997,430 | 8/1961 | Förn | 204/272 X |
| 3,104,221 | 9/1963 | Hill | 204/272 X |
| 3,505,188 | 4/1970 | Pan | 204/149 |

Primary Examiner—Arthur C. Prescott
Attorney, Agent, or Firm—Schmidt, Johnson, Hovey & Williams

[57] ABSTRACT

A foam generating unit has a normally lower, tubular generating section provided with a pair of electrodes that expose incoming, foamable liquid to electrolytic action that results in the generation of foam bubbles. The generating section is normally submerged well below the surface of the liquid into which the generator is inserted, and a tubular chimney section attached to and leading upwardly from the upper end of the generating section confines the bubbles as they rise from the electrodes so as to prevent their dispersion into the body of liquids surrounding the generating unit. This aides in the formation of a thick, creamy foam as the bubbles finally emerge from the upper end of the chimney section near the upper surface of the liquid.

7 Claims, 2 Drawing Figures

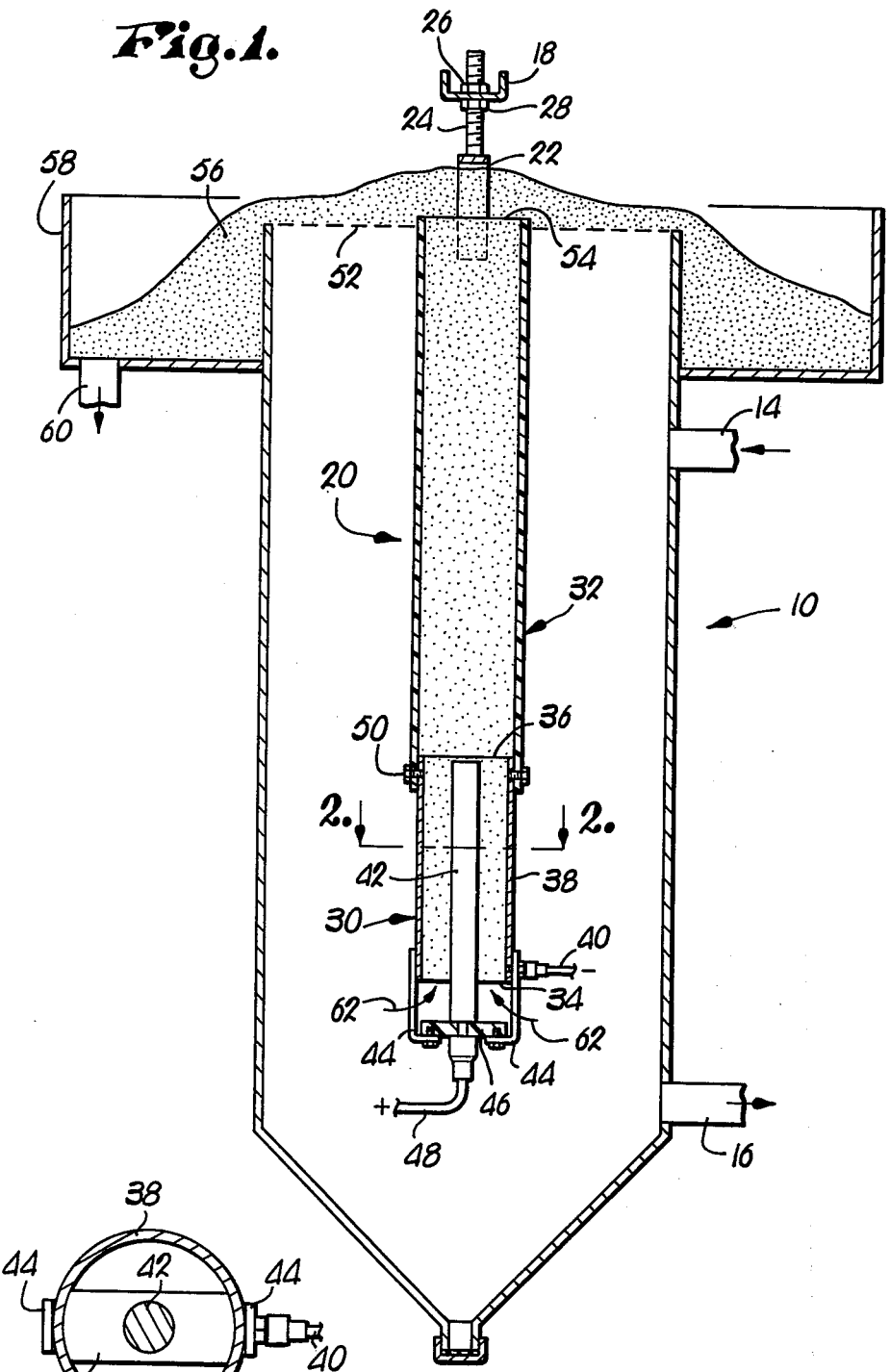

FOAM GENERATING METHOD AND APPARATUS

CROSS-REFERENCES

This application is a continuation-in-part of my prior co-pending application titled METHOD AND APPARATUS FOR PRODUCING FOAM, Ser. No. 807,051 filed June 16, 1977 now U.S. Pat. No. 4,120,765.

TECHNICAL FIELD

This invention relates to the treatment of waste liquid to remove pollutants through a foaming technique that employs electrolytic action.

BACKGROUND ART

In many respects, the present invention is a continuation of principles set forth in my prior copending application titled METHOD AND APPARATUS FOR PRODUCING FOAM, Ser. No. 807,051 filed June 16, 1977. As stated in said application, generating foam in a liquid has proven to be a very useful way of removing surfactants and particles of waste materials from the liquid. The present invention carries on with this basic concept and yet, provides an alternative to the specific way of employing the concept set forth in said application.

Said application discusses the technique of generating foam bubbles with electrolytic action and forcing the generated bubbles to pass between the electrodes until the top surface of the liquid is reached. In other words, the bubbles are exposed to the oppositely charged electrodes not only in the lower part of the body of liquid, but are also continuously exposed to such electrodes over their complete path of travel to the surface of the liquid. It was found that by doing this, a thick, creamy foam having very small bubble size could be created.

SUMMARY OF THE PRESENT INVENTION

While the techniques and structures of said prior application remain extremely important as a valuable contribution to the art, the present invention relates to the discovery that excellent results can be obtained with a variation of this basic theme. In this regard, it is now been found that the electrodes used to generate the foam bubbles need not extend clear to the top surface of the liquid, provided that the bubbles, once generated by the electrodes, are confined within a chimney after leaving the electrodes and until the upper surface is reached.

For some not yet entirely clear reason, simply allowing the generated bubbles to disseminate freely into the surrounding body of liquid immediately after being generated by the submerged electrodes markedly lowers the quality of the resulting foam to the end that the foam contains bubbles of larger diameter, is less rich and creamy, and is more difficult to handle. But by restricting the generated bubbles to a predetermined, confined path of travel directly above the electrodes until the upper surface of the liquid is reached, the desired quality of foam can be obtained.

BRIEF DESCRIPTION OF THE DRAWING

FIG. 1 is a vertical cross-sectional view of a treater constructed in accordance with the principles of the present invention and capable of carrying out my novel method; and FIG. 2 is a transverse cross-sectional view on an enlarged scale of the lower generating section of the generating unit taken along line 2—2 of FIG. 1.

DETAILED DESCRIPTION

The apparatus 10 includes an upright tank 12 having a liquid inlet 14 adjacent the upper end thereof and a liquid outlet 16 adjacent the lower end thereof. Thus, the tank 12 is adapted to receive and contain a body of liquid to be treated.

An overhead support 18 suspends a foam generating unit 20 down into the tank 12 via a strap 22 attached to the upper end of the unit 20, a threaded stud 24 projecting upwardly from the strap 22, and a pair of jam nuts 26 and 28 threaded onto the stud 24 and clamped against opposite sides of the support 18. The unit 20 is thus held in an upright disposition within the tank 12.

The generating unit 20 is tubular in nature, having a normally lower generating section 30 and a normally upper chimney section 32. Generating section 30 is tubular, having an inlet 34 at its lower end and an outlet 36 at its upper end, both of such openings being disposed in axial registration with the longitudinal axis of the tubular section 30. An annular wall 38 of electrically conductive material such as iron extends between the inlet 34 and the outlet 36 and defines the lateral extremities of the generating section 30. A lead 40 connected to the lower end of the wall 38 couples the latter with one side of a source of electrical potential such as to transform the wall 38 into a charged electrode.

The generating section 30 further includes another electrode 42 of rod-like configuration concentrically received within and radially spaced from the outer electrode 38. Inner electrode 42 may be constructed from any suitable electrically conductive material such as, for example, carbon, and is supported within the outer electrode 38 via a pair of straps 44 that depend from the lower end of the outer electrode 38 and are inwardly turned to carry a supporting plate 46 of dielectric material which in turn carries the inner electrode 42. Note that the straps 44 extend downwardly from the lower end of the outer electrode 38 a sufficient distance to avoid interference with the inlet 34. Additionally, a lead 48 connected to the lower end of the inner electrode 42 couples the latter with a source of electrical potential on the opposite side thereof as the lead 40.

The chimney section 32 is of tubular configuration and is attached at its lower end via suitable means such as the screws 50 to the upper end of the outer electrode 38 so as to lead upwardly from the outlet 36. Chimney section 32 is in axial alignment with the outer electrode 38, the inner electrode 42, the outlet 36 and the inlet 34 and extends from the generating section 30 up to the top surface of the body of liquid as indicated by the numeral 52. The exact position of the discharge end 54 of chimney section 32 with respect to the upper surface 52 can be regulated by adjustment of the jam nuts 26, 28. As shown, although the internal diameter of the chimney section 32 is slightly greater than the internal diameter of the outer electrode 38, such dimensions are substantially the same so that there is no major, abrupt change in cross-sectional areas of the generating section 30 and the chimney section 32.

Foamable liquid is supplied to the tank 10 via the inlet 14. Spent liquid and a certain amount of foamable liquid that may be recirculated departs from the tank 12 via the outlet 16, and during the time that the body of liquid remains within the tank 12, it is subjected to the electrolytic action of the generating section 30. When the two electrodes 38 and 42 are connected across opposite sides of a source of electrical potential and the body of liquid within the tank 12 and within the inside of the generating unit 20 is an electrolyte, an electrolytic action will be caused which produces bubbles within the generating section 30. Such bubbles immediately rise from the generating section 30 and enter the chimney section 32 where they are confined and contained against dissemination into the surrounding body of liquid. As the bubbles finally reach the upper discharge end 54 of the chimney section 32, they combine with countless other bubbles to issue forth as a thick, creamy foam which lies on top of the upper surface 52. If desired, this foam, designated broadly by the numeral 56, may spill over into a weir 58 having an outlet 60 for transfering the foam 56 to a remote area.

The rising bubbles within the generating unit 20 induce an inflow of additional liquid into the inlet 34 as shown by the arrows 62. Such inflow of liquid thus presents a fresh supply of foamable liquid to the generating section 30, and after the bubbles have been generated within the liquid and have left the discharge end 54 of the unit 20, the liquid is free to spill over the end 54 and return to the body. Thus, a natural pumping action is achieved without the aid of auxiliary pumps of any kind.

Note that relatively short segments of electrodes 38 and 42 may be utilized in connection with the present invention, thereby substantially reducing material costs. Preferably, the chimney section 32 is constructed of a suitably dielectric material that will insulate the support 18 and its associated hardware from the outer electrode 38 and yet will also serve as a means for producing the desired chimney effect for the rising bubbles. By containing the rising bubbles in this manner and avoiding their dissemination into the surrounding body of liquid, the high quality foam obtained in the apparatus and method set forth in my said prior application can still be obtained, yet at a lower cost insofar as materials, installation and operation are concerned.

I claim:

1. A foam generating unit for use in producing foam by electrolytic action on a body of foamable liquid, said unit comprising:
    a tubular generating section having an inlet at one end, an outlet at the other end, and a pair of opposed, oppositely charged electrodes extending between said inlet and outlet for exposing the liquid to electrolytic action as it flows through said generating section, thereby producing foam bubbles; and
    a tubular chimney section leading beyond and away from said outlet of the generating section for confining foam bubbles produced by said electrolytic action against dispersion until reaching a discharge end of said chimney section remote from said electrodes,
    said chimney section being substantially the same transverse cross-sectional size as said generating section.

2. A foam generating unit as claimed in claim 1, wherein said electrodes are concentrically arranged one within the other.

3. A foam generating unit as claimed in claim 2, wherein said chimney section is disposed in axial registration with said generating section and said outlet is likewise axially aligned with both of said sections.

4. A foam generating unit as claimed in claim 3, wherein said inlet is in axial alignment with said outlet.

5. A foam generating unit as claimed in claim 1, wherein one of said electrodes comprises a cylindrical rod and the other of said electrodes comprises an annular wall circumscribing said rod in radially spaced relation therewith and defining the lateral extremities of said generating section.

6. A foam generating unit as claimed in claim 5, wherein said chimney section has substantially the same internal diameter as the internal diameter of said generating section.

7. In apparatus for use in generating foam by exposing a body of foamable liquid to electrolytic action, the improvement comprising:
    a tank adapted to receive said body of liquid; and
    an upright generating unit received within said tank in disposition to be immersed within a body of the liquid contained in the tank,
    said unit including a normally lower, tubular, generating section having an inlet from the tank at the lower end thereof, an outlet at the upper end thereof, and a pair of opposed, oppositely charged electrodes extending between said inlet and outlet for generating foam bubbles in the liquid when the latter is contained in the tank and as it flows upwardly through said section by natural action from the body of liquid within the tank,
    said unit further including a normally upper, tubular chimney section leading upwardly beyond and away from said outlet of the generating section for confining foam bubbles produced by said generating section against dispersion into said body of liquid until at least substantially reaching the top surface of said body of liquid,
    said chimney section being substantially the same transverse cross-sectional size as said generating section.

* * * * *